US011331726B2

(12) United States Patent
Herzog

(10) Patent No.: US 11,331,726 B2
(45) Date of Patent: May 17, 2022

(54) DEVICE FOR THE GENERATIVE PRODUCTION OF A THREE-DIMENSIONAL OBJECT

(71) Applicant: CL SCHUTZRECHTSVERWAL TUNGS GMBH, Lichtenfels (DE)

(72) Inventor: Frank Herzog, Lichtenfels (DE)

(73) Assignee: CONCEPT LASER GMBH, Lichtenfels (DE)

(*) Notice: Subject to any disclaimer, the term of this patent is extended or adjusted under 35 U.S.C. 154(b) by 70 days.

(21) Appl. No.: 15/751,830

(22) PCT Filed: Dec. 2, 2016

(86) PCT No.: PCT/EP2016/079609
§ 371 (c)(1),
(2) Date: Feb. 9, 2018

(87) PCT Pub. No.: WO2017/102384
PCT Pub. Date: Jun. 22, 2017

(65) Prior Publication Data
US 2018/0236550 A1 Aug. 23, 2018

(30) Foreign Application Priority Data
Dec. 14, 2015 (DE) .......................... 102015121748.1

(51) Int. Cl.
*B22F 10/20* (2021.01)
*B29C 64/135* (2017.01)
(Continued)

(52) U.S. Cl.
CPC ................ *B22F 10/20* (2021.01); *B08B 5/02* (2013.01); *B08B 5/023* (2013.01); *B29C 64/135* (2017.08);
(Continued)

(58) Field of Classification Search
CPC ........................... B29C 64/255; B29C 64/135
See application file for complete search history.

(56) References Cited

U.S. PATENT DOCUMENTS 8,895,893 B2 11/2014 Perret et al.
2006/0192322 A1 8/2006 Abe et al.
(Continued)

FOREIGN PATENT DOCUMENTS

DE 102010026139 A1 1/2012
DE 102010052206 B4 6/2015
(Continued)

OTHER PUBLICATIONS

First Chinese Office Action Corresponding to Application No. 201680021063.2 dated Mar. 2, 2019.
(Continued)

*Primary Examiner* — Jacob T Minskey
*Assistant Examiner* — Jennifer A Kessie
(74) *Attorney, Agent, or Firm* — Dority & Manning, P.A.

(57) ABSTRACT

The invention relates to a device (1) for the generative production of a three-dimensional object (2) by means of successive layer-by-layer selective solidification of construction material layers consisting of a solidifiable construction material (3), by means of at least one laser beam (5), comprising at least one device (4) for generating at least one laser beam (5) for layer-by-layer selective solidification of individual construction material layers consisting of solidifiable construction material (3), a flow device (9) for generating a fluid flow (10) that flows at least partially through a processing chamber (8) of said device (1), and a detection device (12) for detecting an item of flow information describing at least one physical parameter and/or at least one chemical parameter of the fluid flow (10).

20 Claims, 5 Drawing Sheets

Figure 1:
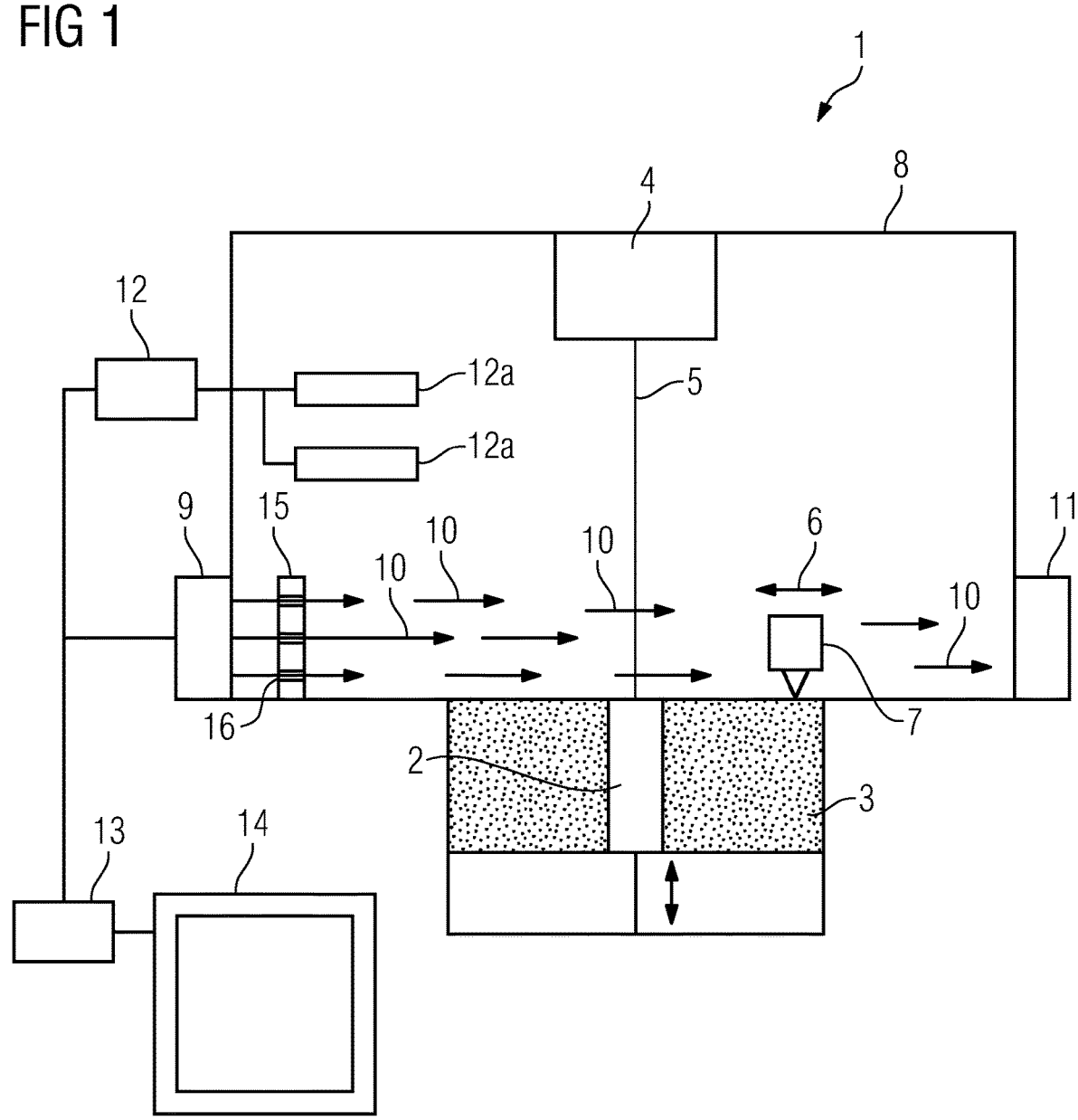

(51) Int. Cl.
*B08B 5/02* (2006.01)
*B29C 64/35* (2017.01)
*B29C 64/307* (2017.01)
*B29C 64/153* (2017.01)
*B22F 10/30* (2021.01)
*B33Y 10/00* (2015.01)
*B33Y 30/00* (2015.01)

(52) U.S. Cl.
CPC .......... *B29C 64/153* (2017.08); *B29C 64/307* (2017.08); *B29C 64/35* (2017.08); *B22F 10/30* (2021.01); *B33Y 10/00* (2014.12); *B33Y 30/00* (2014.12); *Y02P 10/25* (2015.11)

(56) References Cited

U.S. PATENT DOCUMENTS

| | | | |
|---|---|---|---|
| 2012/0223059 A1 | 9/2012 | Ackelid | |
| 2013/0193620 A1* | 8/2013 | Mironets | B23K 15/0086 |
| | | | 264/401 |
| 2015/0367574 A1 | 12/2015 | Araie et al. | |
| 2016/0114530 A1* | 4/2016 | Thiel | B33Y 80/00 |
| | | | 264/401 |
| 2017/0304894 A1* | 10/2017 | Buller | B22F 3/105 |

FOREIGN PATENT DOCUMENTS

| | | |
|---|---|---|
| DE | 102014000022 A1 | 7/2015 |
| DE | 102014205875 A1 | 10/2015 |
| JP | 2009007669 A | 1/2009 |
| JP | 2012224919 A | 11/2012 |
| JP | 5721887 B1 | 5/2015 |
| JP | 2016006215 A | 1/2016 |
| WO | 2009072935 A1 | 6/2009 |
| WO | 2014199150 A1 | 12/2014 |

OTHER PUBLICATIONS

Second Chinese Office Action Corresponding to Application No. 201680021063.2 dated Aug. 26, 2019.
German Search Report Corresponding to Application No. 102015121748.1.
PCT Preliminary Report on Patentability Corresponding to EP Application No. PCT/EP2016/079609 dated Jun. 19, 2016.
Japanese Office Action Corresponding to Application JP2017554598.
International Search Report Corresponding to Application No. PCT/EP2016/079609 dated Feb. 24, 2017.

* cited by examiner

DEVICE FOR THE GENERATIVE PRODUCTION OF A THREE-DIMENSIONAL OBJECT

CROSS-REFERENCE TO RELATED APPLICATIONS

This application is a United States national stage entry of an International Application serial no. PCT/EP2016/079609 filed Dec. 2, 2016 which claims priority to German Patent Application serial no. 10 2015 121 748.1 filed Dec. 14, 2015. The contents of these applications are incorporated herein by reference in their entirety as if set forth verbatim.

The invention concerns a device for the generative manufacture of three-dimensional objects by successive layered selective solidification of built material layers from solidifiable built material comprising at least one device for the generation of at least one energy beam for layered selective solidification of individual built material layers from solidifiable built material and a streaming device for production of a fluid stream passing at least in sections through a processing chamber.

Such devices are known for the generative manufacture of three-dimensional objects. By means of corresponding devices, three-dimensional objects are generatively built up through successive layered selective solidification of built material layers applied in a construction plane from solidifiable built material in respective transverse section areas of the respective object to be manufactured by means of an energy or laser beam.

It is further known how to equip corresponding devices with flow devices for production of a fluid stream passing at least in sections through a processing chamber of the device. Fluid streams produced by means of corresponding flow devices especially serve to evacuate the process gases, i.e. smolder or smoke gas, from the processing chamber for generative construction processes for selective solidification of individual built material layers.

There is a need to develop further corresponding streaming devices with a view to an improved—that is, in particular, needs-oriented and adjustable production of corresponding fluid streams.

The object of the invention thus concerns an improved device for the generative production of three-dimensional objects.

The object is fulfilled by a device according to claim 1. The dependent claims concern particular forms of embodiment of the device. The object is further fulfilled by a procedure in accordance with claim 13.

The device described herein serves in general the additive or generative manufacture of at least one three-dimensional object—that is, for example, of a technical component or of a technical component group through successive layered selective solidification of individual built material layers from a solidifiable built material by means of at least one energy beam produced by an energy beam generator. The energy beam can be a laser beam and the device can correspondingly be one for carrying out a selective laser melt process (SLM process) or selective laser sintering process (SLS process).

The successive selective solidification of built material layers to be solidified is accomplished on the basis of construction data about the object. Corresponding construction data generally describe the geometrical constructive form of the three-dimensional object being formed (designated in the following as "object"). Corresponding construction data can, for example, be CAD data about the object being manufactured or contain such data.

The device comprises the typically required functional components for carrying out generative construction processes—that is, in particular, a device producing an energy beam, which is configured for the generation of at least one energy beam for successive layered selective solidification of individual built material layers from a solidifiable built material—that is, in particular, a metal, plastic, and/or ceramic in powder form and a coating unit that is configured for formation of built material layers on one construction plane.

The construction plane can be the surface of a carrier element of a carrier device typically displaceable (in a vertical direction) or of an already selectively solidified built material layer. Selectively solidifiable or selectively solidified built material layers are generally formed on one construction plane.

The device comprises a streaming device that produces a fluid stream flowing at least in sections through a construction or processing chamber of the device, in which construction or processing chamber generative construction processes are carried out. The streaming device serves particularly to remove the process gases, i.e. smolder or smoke gas, in a corresponding fluid stream from the processing chamber of the device that uses generative construction processes for selective solidification of individual built material layers. The streaming device can, for example, at least comprise a compressor device for production of a corresponding fluid stream. With fluid streaming produced by the streaming device it can, for example, be a case of compressor streaming.

Fluid streaming is produced by at least one streaming fluid. The streaming fluid forming the fluid stream is typically an inert gas (mixture), for example argon, nitrogen, $CO_2$, etc. It is thus typically an inert gas stream in a corresponding fluid stream.

It is possible that the device further comprises a suction device that is configured to evacuate an outflowing fluid stream from the processing chamber. The suction device can thus be configured for production of a suction flow.

The device further comprises a detecting device that is configured for detecting streaming information indicating or describing of at least one physical parameter and/or at least one chemical parameter of the fluid stream. On the basis of the streaming information detected by means of the detecting device, different physical and/or chemical information can be obtained regarding the fluid stream.

As mentioned, the streaming information describes different physical and/or chemical parameters of the fluid stream. The streaming information as physical parameters can describe the density, pressure and the temperature of the fluid stream or of the streaming fluid as well as diverse streaming parameters—that is, in particular, the kind of streaming (for evaluation of the question as to whether a laminar or turbulent stream is occurring) and the speed of the stream in a streaming profile of a given streaming cross-section area. The physical parameters can be directly or indirectly described by the streaming information, i.e. by means of an intermediate value convertible to the value described. Conclusions can be drawn using the physical parameters, for example regarding the efficiency of the exhaust system for the process gases from the processing chamber. Increasing density or temperature of the fluid stream or streaming fluid in its streaming run can, for example, point to the collection of corresponding process gases in the streaming fluid and thus to efficient evacuation of them from the process chamber.

The streaming information can describe chemical parameters of fluid streaming or especially the proportionate chemical composition of the fluid stream or of the streaming fluid. The chemical parameters can be directly or indirectly described by the streaming information, i.e. by means of an intermediate value convertible to the value described. Conclusions can be drawn regarding the chemical parameters on the efficiency of the exhaust system in the framework of the process gases originating from the processing chamber of the device. A fluctuating averaged chemical composition of the fluid stream or of the streaming fluid in the form of raising the amount of the corresponding constituents of the process gas can, for example, point to the concentration of corresponding process gases in the fluid stream or in the streaming fluid and thus to efficient evacuation of them from the process chamber.

In any case, a quantitative and/or qualitative assessment of the evacuation of corresponding process gases from the process chamber is possible by detecting the streaming information. As will be shown in the following, a partially or fully automated adjustment of diverse parameters of the fluid streaming or an adjustment to the operation of the streaming device, and where appropriate also of the operation of a suction device, if available, can be done on the basis of this assessment. A feedback system or control circuit can be implemented by means of which the evacuation of corresponding process gases from the process chamber is controlled or guided with respect to a preset control variable or control parameter.

The device can comprise an output device for output information, which visualizes streaming information via the detecting device. Detecteded flow information can be issued and made available to a user of the device via a corresponding output device that, for example, is formed as a display, or at least comprises one, and can be displayed to a user of the device. The visualization information can include a graphic, specially a color, image of individual, several, or all detected physical and/or chemical parameters. Changes in individual, several, or all detected physical and/or chemical parameters can be depicted graphically, particularly in color. Depiction of changes in detected physical and/or chemical parameters can similarly be realized like "rain radar" known from weather reports. Visualization can be done in that the (streaming of) fluid streaming through the process chamber is depicted where appropriate with a graphically emphasized process gas component.

The detecting device is equipped for detecting these physical and/or chemical parameters of the fluid streaming with appropriate, especially (metering) probe-like, detecting elements. With regard to the detectable parameters or the parameters to be detected, it is a matter basically of known sensing elements or sensing element groups or devices in corresponding detecting elements. Detecting the temperature of a streaming fluid can, for example, be carried out by means of known temperature measuring elements, the detecting of the speed of streaming by means of known mechanical or optical or electromechanical detecting elements, for example as a constituent of a flow-through measuring device, or a laser-Doppler-anemometrical device, of a radar device of an ultrasound device, etc.

The parameters detected by means of detecting elements can be transmitted as data to an appurtenant data processing or control device and there be processed in order to be able to send them to a corresponding feedback system or control loop to be used in it.

Corresponding detecting elements are typically installed in the processing chamber. Dependent on the functional or constructive layout, the detecting elements can at least partially be directly connected in sections in the fluid stream so that the fluid stream directly flows around them at least in sections.

Individual, several, or all detecting elements can be displaceably mounted with at least one degree of freedom. Individual, several, or all detecting devices can be displaceably mounted, for example between a first position within a processing chamber, which position can be an operational position in which detecting corresponding parameters of the fluid stream is possible, and at least a further position within the processing chamber which can (also) be an operational position in which detecting corresponding parameters of the fluid stream is possible, or a non-operational position in which detecting corresponding parameters of the fluid stream is not possible. Alternatively or supplementarily it is possible that individual, several, or all detecting devices are displaceably mounted between a first position within a processing chamber, which position can be an operational position, in which detecting corresponding parameters of the fluid stream is possible, and a further position outside the processing chamber, which can be a non-operational position in which detecting corresponding parameters of the fluid stream is not possible. It is possible by means of a displaceable mounting of corresponding detecting elements to detect corresponding parameters of the fluid stream or the streaming fluid at different places in the processing chamber. Local and/or time-resolved detecting or assessment of corresponding parameters—that is, especially, local and/or time-resolved changes in detected parameters as well—can be depicted in this way.

The movements of a detecting element can comprise both translatory and rotational degrees of freedom. Combined movements in different degrees of freedom are, of course, also possible. An appropriate guide element, for example comprising a roller and/or rail-like guide device, can be present for implementation of guided movements of a detecting element along a given movement track. The displaceable mounting of a detecting element can be realized, for example, by an (electric) motor propulsion drive, by means of which the detecting element is displaceable in at least one degree of freedom.

At least one displaceably mounted detecting element can advantageously be displaceable together with at least one further functional component mounted with at least one degree of freedom Between the displaceably mounted detecting element and the displaceably mounted functional component of the device there is a direct or indirect movement coupling realized with interposition of at least one further component. The displacement coupling typically results in an even motion of the detecting element and the functional component. The corresponding functional component can, for example, be a coating unit that is displaceably mounted relative to a component to be coated.

The streaming device can at least be relatable or related to a diffusor element for production of a uniform or evenly distributed, in particular laminar, streaming profile of the fluid stream. A corresponding diffusor element comprises several streaming openings that can be permeated by a streaming fluid. Individual, several, or all streaming openings can be formed and/or installed as honeycombed. A honeycomb formation and/or configuration of corresponding streaming openings acts positively on production of a uniform or evenly distributed, in particular laminar, streaming profile of the fluid stream.

This can be displaceably mounted with at least one degree of freedom and independent of the concrete configuration of a diffusor element. The movements of a diffusor element can comprise both translatory and rotational degrees of freedom. Combined movements in different degrees of freedom are, of course, also possible. An appropriate, for example a roller and/or rail-like, guide element comprising a guide device can be present for implementation of guided movements of a detecting element along a given movement track. The displaceable mounting of a diffusor element can be realized by means of, for example, an (electro)motor propulsion drive unit by means of which the diffusor element is displaceable in at least one degree of freedom.

A movably mounted diffusor element can be mounted to be displaceable in particular between one position inside the process chamber, at which position it is in an operating position in which an even consistency of the fluid stream is possible through the diffusor element and a position outside the process chamber, which position is a non-operating position in which smoothing out the fluid stream through the diffusor element is not possible. Movement between a corresponding operating position within the processing chamber and a corresponding non-operating position outside the processing chamber can, for example, be realized through displaceable storage of a diffusor element. The diffusor element is displaceable by pushing it into the processing chamber or by pulling it from the processing chamber between the operating and non-operating position.

To the extent that the device comprises several diffusor elements, they can be installed to switch in series after each other. A flow chamber is formed between two diffusor elements installed immediately adjacent to each other. Differently dimensioned flow chambers can be formed by means of appropriate spacing of the diffusion elements. Influence can be exerted on diverse flow parameters by dimensioning corresponding flow chambers, i.e. especially the kind of flow, the fluid streaming.

At least one diffusor element can be mounted to be displaceable in at least one degree of freedom relative to at least one further diffusion element, with the flow chamber formed between two immediately adjacently installed diffusor elements being alterable in its dimensioning, particularly in its volume. As mentioned, influence can be exerted on diverse flow parameters by dimensioning corresponding flow chambers, i.e. the kind of flow of the corresponding flow spaces.

It was mentioned that the movements of a diffusor element can comprise both translatory and rotational degrees of freedom. Combined movements in different degrees of freedom are, of course, also possible. The displaceable mounting of a diffusor element can, as mentioned, be realized by means of, for example, an (electro)motor drive by means of which the diffusor element is displaceable in at least one degree of freedom. For implementation of movement of a diffusor element along a given displacement track, an appropriate, for example a roller and/or rail-like, guide element comprising a guide device can be present. Especially in the case of a diffusor element that has a basic form that is geometrically plate-like or plate-formed, it is conceivable to mount it on a vertical axis to be rotational or swivel-mounted, so that it can be pivoted between an operating position in which corresponding flow openings are directed toward the fluid stream, with smoothing out of the fluid stream being possible, and a non-operating position in which corresponding flow openings are not directed in the flow direction of the fluid stream and smoothing out of the fluid stream is not possible.

Flow chambers formed between two diffusor elements installed directly adjacent to each other can basically comprise any (spatial) geometrical form. The (spatial) geometrical form of a flow chamber is a further factor for influencing diverse flow parameters of fluid streaming.

A given flow chamber can (also along with corresponding diffusor elements installed immediately adjacent to each other) be limited by at least one wall element extending between two diffusor elements configured to be directly adjacent to each other. Configured or formed wall elements that extend between diffusor elements can be provided for further spatial limitation of flow chambers. Corresponding wall elements can be stored in at least one degree of freedom displaceable to each other and/or relative to at least one diffusor element.

Movements of a wall element can comprise both translatory and rotational degrees of freedom. Combined movements in different degrees of freedom are, of course, also possible. The displaceable mounting of a wall element can be realized by means of, for example, an (electro)motor drive by means of which the wall element is displaceable in at least one degree of freedom. For implementation of guided displacement along a given displacement track of a wall element, an appropriate, for example a roller and/or rail-like, guide element comprising a guide device can be present.

Tilting or swiveling movements of a wall element around a tilt or swivel axis around a horizontal tilt or swivel axis can be of special functionality, since in that way a type of funnel-shaped flow chambers can be formed. Influence on diverse flow parameters of the fluid stream, especially the type of flow and the speed of flow, can systematically be exerted through funnel-shaped expandable or reducible flow chambers.

The device advantageously comprises a control device and/or controller that is configured for control or management of the generated or producible fluid stream by means of the flow device. The controller is especially configured for regulation or control of the operation of the flow device, —that is, especially, for regulation or control of at least one flow parameter and/or of the averaged composition of the streaming fluid, and/or for regulation or control of motions of diffusion elements mounted to be displaceable, and/or for control of motions of displaceably stored wall elements independent of the detected flow information. The control device can, of course, also be configured for control of the operation of a corresponding suction device, if it is present.

The invention further concerns a procedure for the generative manufacture of at least one three-dimensional object by successive layered selective solidification of built material layers from solidifiable built material by means of an energy beam. The procedure is characterized in that a device as described is used for the generative manufacture of an object. Corresponding flow information is detected by means of a corresponding detecting device. All embodiments in connection with the device are analogously valid for the procedure.

The invention is explained in more detail in the exemplary embodiments in the drawings. The following are shown:

FIGS. 1-5 a schematic diagram of a device according to an exemplary embodiment of the invention.

FIG. 1 shows a schematic diagram of a device 1 according to an exemplary embodiment. Device 1 enables the manufacture of three-dimensional objects 2—that is, in particular, technical components or technical component groups, by means of successive, layered, selective solidification of built material layers from a solidifiable built material 3, for example a metal powder by means at least of one energy beam 5, produced by an energy beam generating device 4. The successive, layered, selective solidification of built material to be solidified is carried out in that energy beams 5 from the energy beam generator 4 are selectively directed on the cross-section geometry of layers to be solidified corresponding to areas of built material layers of the object 2 that will be manufactured.

Device 1 can be configured as a laser melting device or a selective laser sintering device. It can correspondingly be a laser beam generating device in the case of energy beam generating device 4 and correspondingly a laser beam in the case of energy beam 5. A laser beam generating device can comprise one or more laser diodes for the generation of a laser beam. The laser diodes can be configured internally or externally to a processing chamber 8 of the device. Laser diodes installed outside the processing chamber 8 must be optically connected with suitable optical elements, especially in the form of focusing optics inside processing chamber 8, for example by a light conductor.

Particular built material layers to be solidified are formed by means of a displaceably mounted coating unit 7 in the processing chamber 8 of device 1, as indicated by the horizontal double arrow 6.

The device 1 comprises a streaming device 9 that is configured for production of a fluid stream (cf. arrow 10) flowing through processing chamber 8. The flow device 9 serves particularly to remove the process gases, i.e. smolder or smoke gas, in a corresponding fluid stream 10 from the processing chamber 8 of the device for generative construction processes for selective solidification of individual built material layers. Since it typically concerns an inert gas (mixture) in a streaming fluid that forms flow stream (10), the flow device 9 serves to form and maintain an inert atmosphere inside processing chamber 8.

The streaming device 9 can, for example, be configured for production of a corresponding fluid stream 10 and, for example, be configured as a compressor device or at least comprise one. With the fluid stream 10 producible from the streaming device 9 it can, for example, be a case of compressor streaming.

A diffusion element 15 is associable or associated with a streaming device 10 for production of a uniform or evenly distributed, in particular laminar, streaming profile of the fluid stream. The diffusion element 15 comprises several flow openings 16. Even though not depicted everywhere in the Fig. for reasons of clarity, every diffusion element 15 is provided with corresponding flow openings 16. The flow openings 16 can be configured and/or formed as honeycombs (cf. FIG. 4).

The diffusion element 15 can be displaceably mounted with at least one degree of freedom. The movements of diffusor element 15 can comprise both translatory and rotational degrees of freedom. Combined movements in different degrees of freedom are possible. For implementation along a given displacement track of guided movements of diffusor element 15, an appropriate, for example a roller and/or rail-like, guide element (not shown) comprising a guide device (not shown) can be present. The displaceable mounting of a diffusor element 15 can be realized by means of, for example, an (electro)motor drive (not shown) by means of which the diffusor element 15 is displaceable in at least one degree of freedom.

A displaceably mounted diffusor element 15 can be mounted to be displaceable between one position inside the process chamber 8, at which position it is an operating position in which an even consistency of the fluid stream 10 is possible through the diffusor element 15 and a position outside the processing chamber 8, which position is a non-operating position in which smoothing out the fluid stream 10 through the diffusor element 15 is not possible. Movement between a corresponding operating position within the processing chamber 8 and a corresponding non-operating position outside the processing chamber 8 can, for example, be realized through displaceable storage of the diffusor element 15. The diffusor element 15 is displaceable by pushing it into the processing chamber 8 between the operating and non-operating position. The processing chamber 8 can for this purpose be provided with a sealable opening (not shown) through which the diffusion element 15 can be displaced into the processing chamber 8 and out of the processing chamber 8.

A displaceable mounted diffusion element 15 can be displaceable together with at least one further functional component of device 1 mounted with at least one degree of freedom, such as for example the coating unit 7. Between the displaceably mounted diffusor element 15 and the displaceably mounted functional component there is in this case a direct or indirect displacement coupling realized by interposition of at least one further component.

A suction device 11 positioned opposite flow device 9 in a horizontal plane can optionally be configured to evacuate the fluid stream 10 conducted from the processing chamber 8 to be evacuated from processing chamber 8. The suction device 11 is accordingly configured for production of a suction flow.

In the exemplary embodiments shown in the Fig., the flow device 9 or the optional suction device 11 is configured to be outside the processing chamber 8. The flow device 9 is connected by means of suitable circuit elements (not shown) with the processing chamber 8 in order to produce the fluid stream 10 at least in sections. The suction device 11 is also connected by means of circuit elements (not shown) with the processing chamber 8 in order to produce the suction flow. The flow device 9 and/or the suction device 11 could in principle also be configured inside the processing chamber 8.

The device 1 further comprises a detecting device 12 that is configured for detecting streaming information indicating or describing at least one physical parameter and/or at least one chemical parameter of the fluid stream 10. On the basis of the streaming information detected, different physical and/or chemical information can be obtained regarding the fluid stream 10.

The streaming information as physical parameters can describe the density, pressure, and the temperature of the fluid stream 10 or of the streaming fluid as well as diverse streaming parameters—that is, in particular, the kind of streaming (for evaluation of the question as to whether a laminar or turbulent stream is occurring), and the speed of the stream in a streaming profile of a given streaming (cross section) area. Conclusions can be drawn from the physical parameters regarding the efficiency of removal from the processing chamber 8 of the process gases originating with generative construction processes. Increasing density or temperature of the fluid stream 10 or of the streaming fluid in its streaming run can, for example, point to the collection of corresponding process gases in the streaming fluid and thus to efficient evacuation of them from the process chamber 8.

The streaming information can describe chemical parameters of fluid stream 10 or of the streaming fluid, especially the proportionate chemical composition of the fluid stream 10 or of the streaming fluid. Conclusions can be drawn from the chemical parameters on the efficiency of the evacuation of the process gasses originating from generative construction processes from the processing chamber 8 of the device. A fluctuating averaged chemical composition of the fluid stream 10 or of the streaming fluid in the form of raising the amount of the corresponding constituents of the process gas can, for example, point to the concentration of corresponding process gases in the fluid stream 10 or in the streaming fluid and thus to efficient evacuation of them from the process chamber 8.

The detecting device 12 is equipped for detecting these physical and/or chemical parameters of the fluid stream with appropriate, especially (metering) probe-like, detecting elements 12*a*. With regard to the detectable parameters or the parameters to be detected, it is a matter basically concerning corresponding sensing elements 12*a* of known meter elements or metering groups or metering devices. Detecting the temperature of a fluid stream 10 can, for example, be carried out by means of known temperature measuring elements, the detecting of the speed of streaming by means of fluid stream 10 or of the streaming fluid, for example by means of known mechanical or optical detecting elements 12*a*, for example as a constituent of a flow-through measuring device, or a laser-Doppler-anemometrical device, of a radar device of an ultrasound device, etc.

The detecting elements 12*a* are configured in the processing chamber 8 in the exemplary embodiments shown in the Fig. Depending on the functional or constructive layout, the detecting elements 12*a* can at least partially be directly connected in sections in the fluid stream 10 so that the fluid stream directly flows around them at least in sections.

The detecting elements 12*a* can be displaceably mounted with at least one degree of freedom. The detecting elements 12*a* can, for example, be mounted displaceably between a first position within the processing chamber 8, which position can be an operational position in which detecting corresponding parameters of the fluid stream 10 is possible, and at least a further position within the processing chamber 8 which can (also) be an operational position in which detecting corresponding parameters of the fluid stream is possible, or a non-operational position in which detecting corresponding parameters of the fluid stream 10 is not possible. Alternatively or supplementarily it is possible that individual, several, or all detecting devices 12 are displaceably mounted within a first position within a processing chamber 8, which position can be an operational position in which detecting corresponding parameters of the fluid stream 10 is possible, and a further position outside the processing chamber which can be a non-operational position in which detecting corresponding parameters of the fluid stream 10 is not possible. It is possible by means of a displaceable mounting of detecting elements 12*a* to detect corresponding parameters of the fluid stream 10 or the streaming fluid at different places in the processing chamber. Local and/or time-resolved detecting or assessment of corresponding parameters—that is, especially, local and/or time-resolved changes in detected parameters as well—can be depicted in this way.

A displaceably mounted detecting element 12*a* together with at least one further functional component of device 1 can be mounted with at least one degree of freedom, such as for example the coating unit 7, analogously to a displaceably mounted diffusor element 15. Between the displaceably mounted detecting element 12*a* and the displaceably mounted functional component there is in this case a direct or indirect displacement coupling realized with interposition of at least one further component.

In any case, a quantitative and/or qualitative assessment of the evacuation of corresponding process gases from the process chamber 8 is made possible by detecting device 12. On the basis of the streaming information, a manual, partial, or fully automated adjustment of diverse parameters of the fluid stream 10 or an adjustment of the operation of the streaming device 9, and where appropriate also of the operation of a suction device 11, if available, can be made. A control loop or control parameter can be implemented through which the evacuation of corresponding process gases from the process chamber 8 is controlled or guided with respect to a preset control variable or control parameter.

Implementation of a corresponding control loop or control parameter is carried out by means of a control device 13 communicating with the detecting device 12. The control device 13 comprises appropriate control means (not shown) implemented by hardware and/or software, for example control algorithms, by means of which corresponding processing of the streaming information and generation of corresponding control information can be implemented on the basis of which the evacuation of corresponding process gases from the processing chamber 8 is controlled or guided with respect to a preset control variable or control parameter.

The control device 13 is connected as regards data to output device 14 for output of visualization information which visualizes the captured streaming information. Production of corresponding visualization information can be carried out in the control device 13 or in the output device 14, which are provided for this purpose with suitable hardware and/or software. Detected flow information can be issued and made available to a user of the device 1 via the output device 14 that, for example, is configured as a display, or at least comprises one. The visualization information can include a graphic, specially a color, image of detected physical and/or chemical parameters. Changes in all detected physical and/or chemical parameters can be depicted graphically, particularly in color. Depiction of changes in detected physical and/or chemical parameters can similarly be realized like "rain radar" known from weather reports. Visualization can be carried out in that the (streaming of) fluid stream 10 through the processing chamber 8 is depicted where appropriate with a graphically emphasized process gas component.

Figure 2:
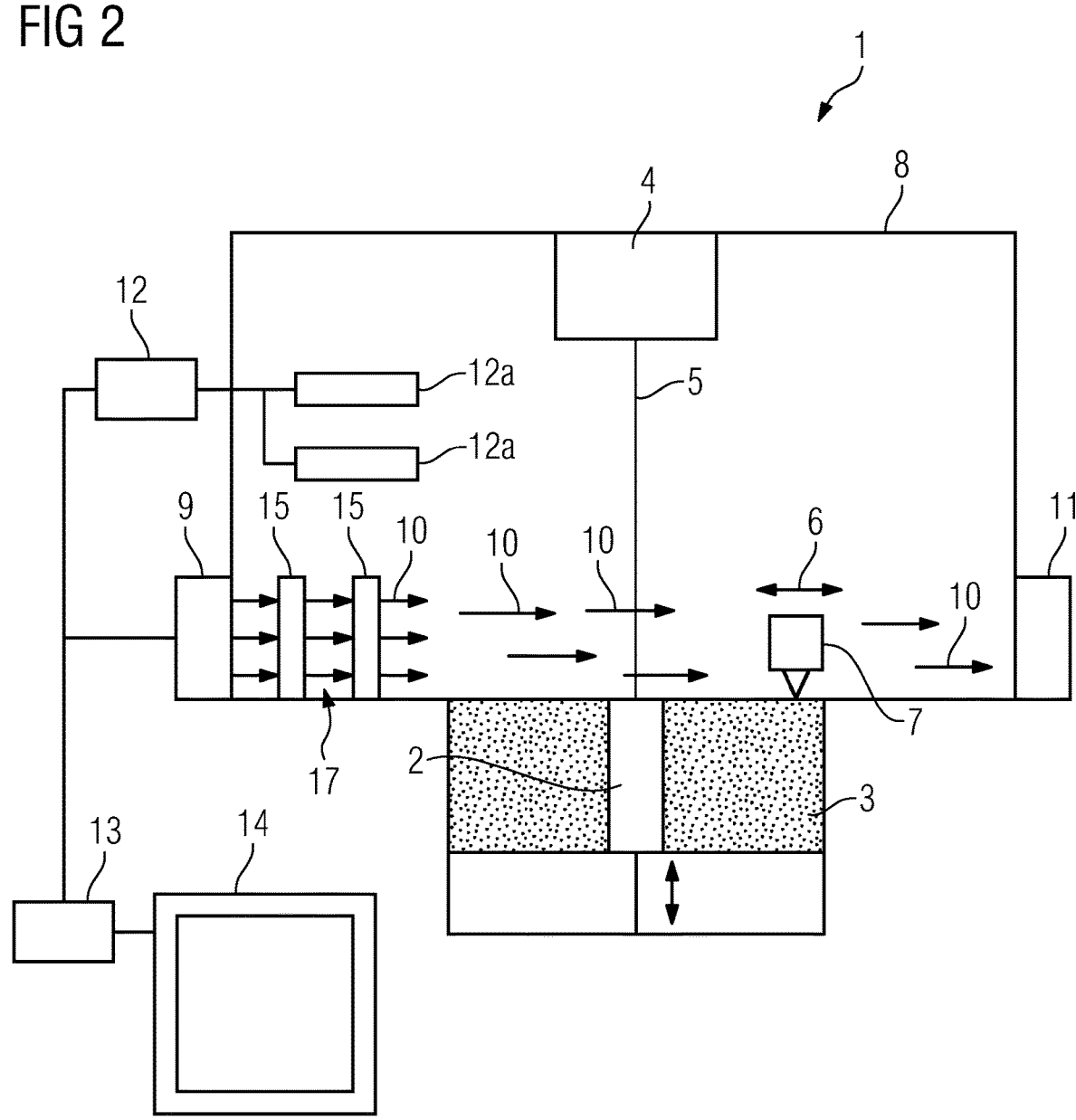

FIG. 2 shows a schematic diagram of a device 1 according to a further exemplary embodiment. In contrast to the exemplary embodiment shown in FIG. 1, the exemplary embodiment shown in FIG. 2 has several diffusor elements 15 available. The diffusor elements 15 are configured in a row and switched after one another. A flow chamber 17 is formed between two diffusor elements 15 installed immediately adjacent to each other. Differently dimensioned flow chambers 17 can be formed by means of appropriate spacing of the diffusor elements 15. Influence can be exerted on diverse flow parameters—that is, especially, the kind of flow—by dimensioning corresponding flow partitions of the fluid stream 10.

Figure 3:
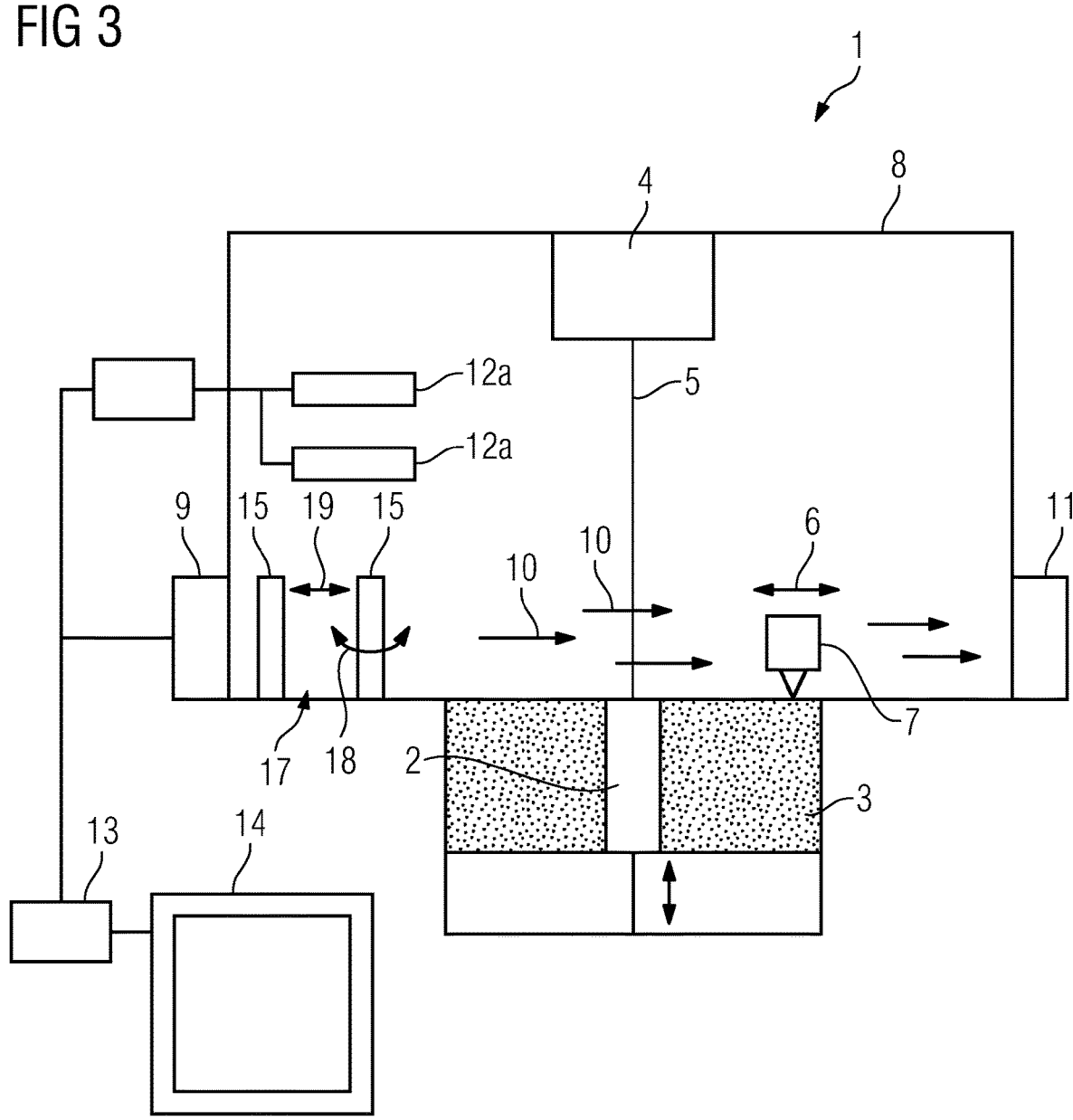
Figure 4:
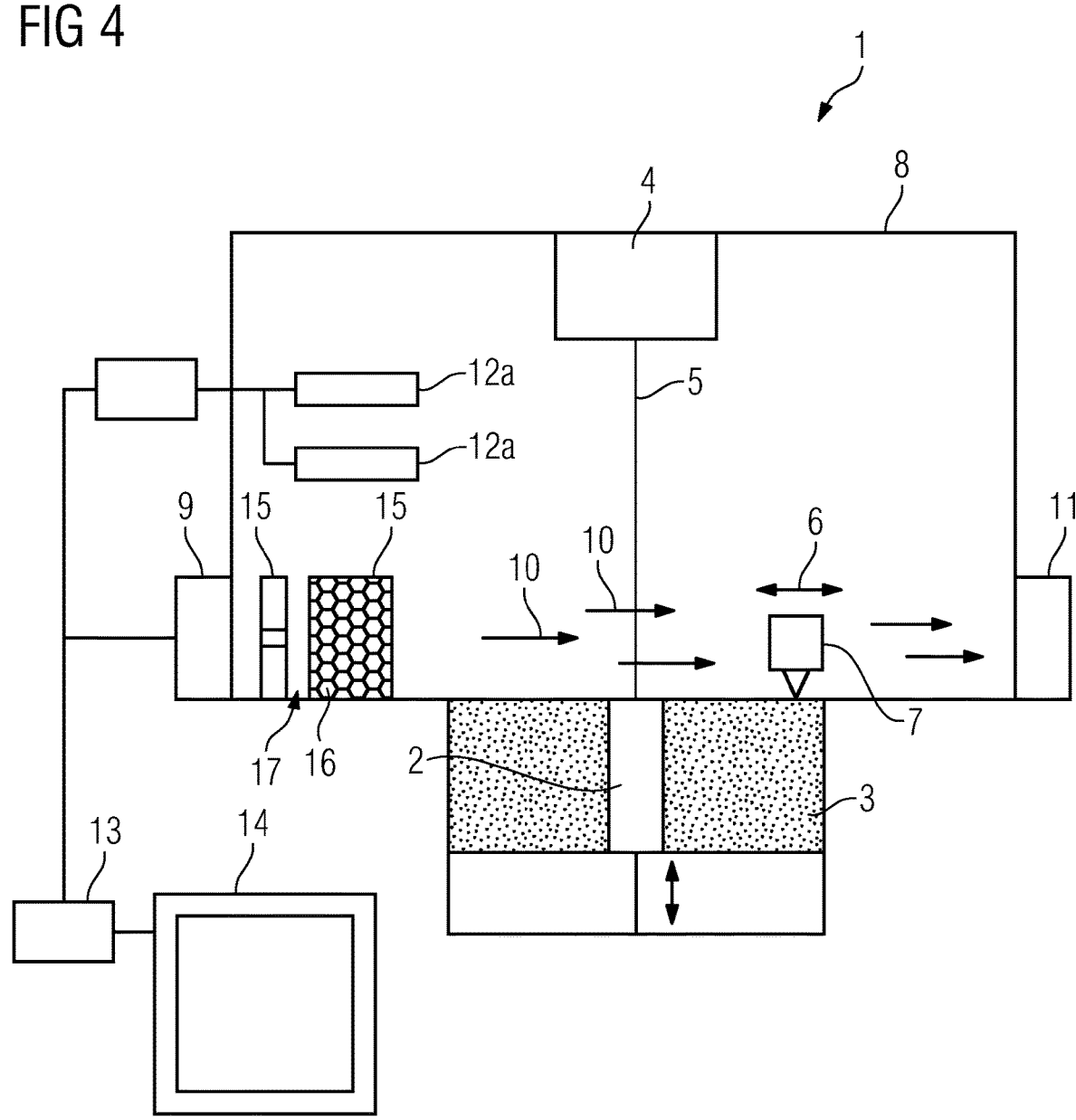

FIGS. 3, 4 show a schematic diagram of a device 1 according to a further exemplary embodiment. In the exemplary embodiments in FIGS. 3, 4, it is shown that at least one diffusor element 15 can be mounted to be displaceable in at least one degree of freedom relative to at least one further diffusion element 15, with the flow partition 17 formed between two immediately adjacently installed diffuser elements 15 being alterable in its dimensioning, particularly in its volume. As mentioned, influence can be exerted on diverse flow parameters by dimensioning corresponding flow partitions 17, i.e. the kind of flow of the corresponding flow stream 10.

On the basis of the double arrows 18, 19 shown in FIG. 3, it can be seen that the movements of a diffusor element 5 can comprise both translatory and rotational degrees of freedom. Combined movements in different degrees of freedom are possible. The displaceable mounting of a diffusor element 15 can, as mentioned, be realized by means of, for example, an (electro)motor drive by means of which the diffusor element 15 is displaceable in at least one degree of freedom. For implementation of guided movements of diffusor element 15 along a given displacement track, an appropriate, for example, a roller and/or rail-like, guide element (not shown) comprising a guide device (not shown) can be present. Particularly for the case shown in the exemplary embodiment in FIGS. 3,4 of diffusor elements 15 with a plate-like or plate-shaped basic geometrical form, it is possible to mount a diffusor element 15 on a vertical axis to rotate or pivot so that it is between an operating position (cf. FIG. 3), in which corresponding flow openings 16 are directed in the direction of flow of fluid stream 10 and smoothing out of fluid stream 10 is possible, and a non-operating position (cf. FIG. 4), in which corresponding flow openings 16 are not rotatable or pivotal in the direction of flow of fluid stream 10 and smoothing out of fluid stream 10 is not possible. In the exemplary embodiments in FIGS. 3,4 the right diffusor element 15 is mounted to rotate or pivot around a vertical axis.

Figure 5:
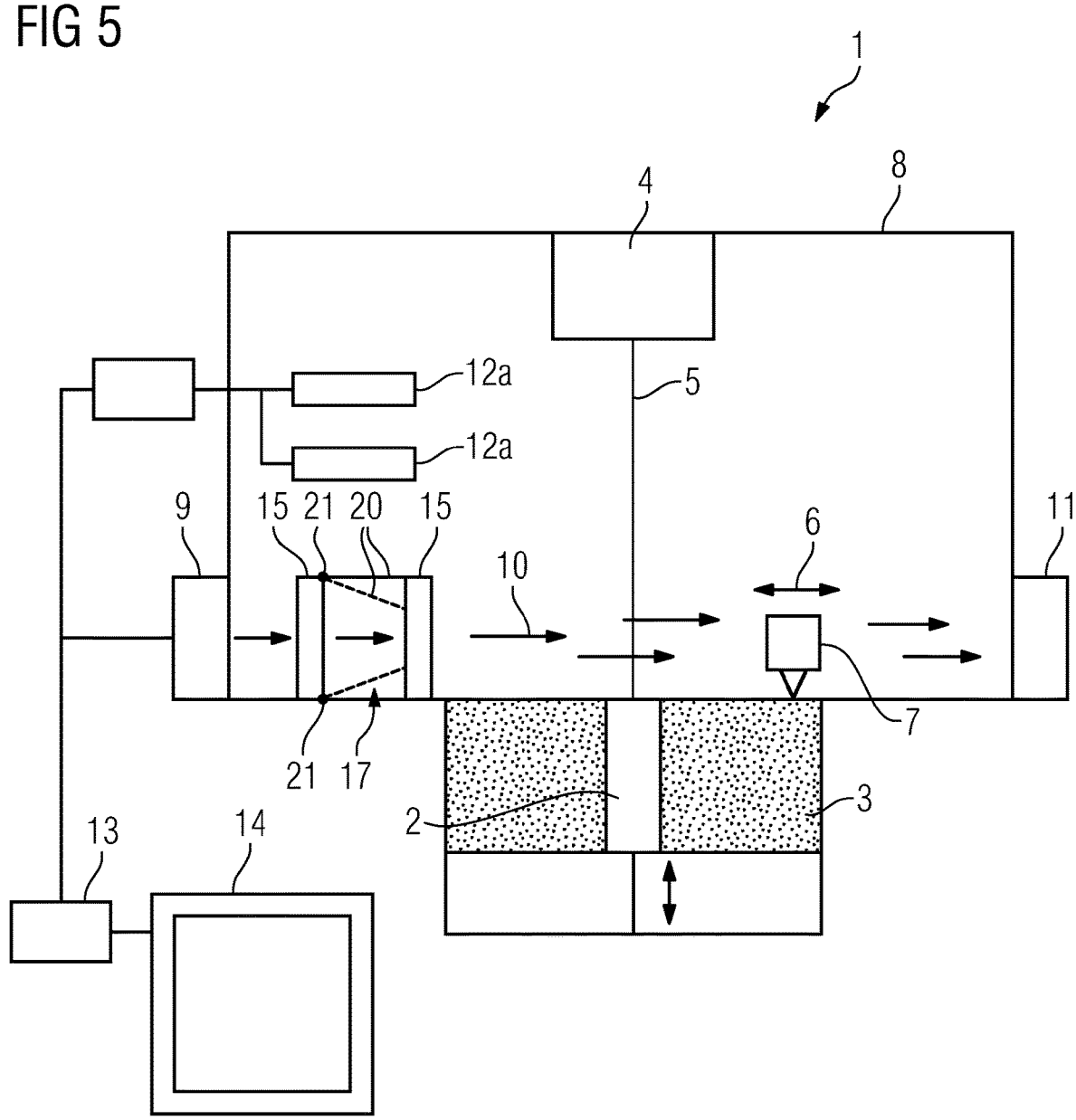

FIG. 5 shows a schematic diagram of a device 1 according to a further exemplary embodiment. On the basis of exemplary embodiments shown in FIG. 5 it is clear that a flow partition 17 can be limited next to corresponding immediately adjacent diffusor elements 15 installed immediately adjacent to each diffusor elements diffusor elements 15 by at least one wall element 20 (extending essentially horizontally). Correspondingly configured or formed wall elements 20 that extend between diffusor elements 15 serve for further spatial limitation of flow partitions 17.

The wall elements 20 can be stored in at least one degree of freedom displaceable to each other and/or relative to at least one diffusor element 15. In the exemplary embodiment shown in FIG. 5 the wall elements 20 are configured to be tiltable or pivotal around a horizontal tilt or pivot axis. The wall elements 20 are for this reason articulated to be tiltable or pivotal on articulation points 21 of one, i.e. the left, diffusor element 15. The wall elements 20 can be vertically oriented on the downstream diffusor element 15 after this diffusor element 15. As shown, dashed, funnel-shaped flow partitions 17 can be formed by means of corresponding tilting or pivoting movements of the wall element 20. By means of expanding or reducing funnel-shaped flow partitions 17, systematic influence on diverse flow parameters of the fluid stream 10, especially the type of flow and the speed of flow, can be exerted.

It is valid for all exemplary embodiments that the controller device 13 can be especially configured for regulation or control of the operation of installed diffusor elements 15 and/or for control of displaceably mounted diffusor elements 15 and/or control of movement of wall elements 20 mounted to be displaceable, especially independent of the detected flow information.

With the devices 1 shown in the Fig., a procedure can be implemented for the generative manufacture of at least one three-dimensional object 2 by successive layered selective solidification of built material layers from solidifiable built material 3 by means of an energy beam 5. The procedure is characterized especially in that corresponding streaming information can be detected by means of detected device 12.

REFERENCE NUMBER LIST

1 Device
2 Object
3 Built material
4 Device for beam generation
5 Energy beam
6 Double arrow
7 Coating unit
8 Processing chamber
9 Streaming device
10 Arrow (fluid streaming)
11 Suction device
12 Detecting device
12a Detecting element
13 Control device
14 Output device
15 Diffusor element
16 Streaming opening
17 Streaming space
18 Double arrow
19 Double arrow
20 Wall element
21 Articulation point

The invention claimed is:

1. An apparatus for additively manufacturing a three-dimensional object, the apparatus comprising:
a processing chamber;
an energy beam generating device configured to generate an energy beam for selective solidification of sequential layers of a build material; and
a fluid streaming device configured to flow a fluid stream through at least a portion of the processing chamber;
a detecting device configured to detect flow information describing a physical parameter and/or a chemical parameter of the fluid stream; and
one or more diffuser elements, wherein at least one of the one or more diffuser elements comprises a plurality of streaming openings, the plurality of streaming openings having a honeycomb configuration configured to diffuse the fluid stream from the fluid streaming device into a uniform streaming profile.

2. The apparatus of claim 1, wherein the detecting device comprises a detecting element locatable or located in the processing chamber.

3. The apparatus of claim 2, comprising the detecting element being displacebly mounted in at least one degree of freedom, the at least one degree of freedom comprising a first position and a second position, the first position being in the processing chamber and the second position being in the processing chamber or outside the processing chamber.

4. The apparatus of claim 3, comprising the detecting element being mounted to a coating unit of the apparatus, the coating unit being displaceably mounted in at least one degree of freedom.

5. The apparatus of claim 3, wherein the at least one diffuser element being mounted so as to be displaceable in at least one degree of freedom.

6. The apparatus of claim 1, comprising: a plurality of diffuser elements, wherein respective ones of the plurality of diffuser elements each comprise a plurality of streaming openings configured to diffuse the fluid stream, wherein the plurality of diffuser elements are configured and arranged consecutively with a streaming space between adjacent respective ones of the plurality of diffuser elements.

7. The apparatus of claim 6, comprising:
a first diffuser element from among the plurality of diffuser elements being displaceably mounted in at least one degree of freedom relative to a second diffuser element from among the plurality of diffuser elements, the first diffuser element being located adjacently upstream or adjacently downstream from the second diffuser element, wherein the first diffuser element is movable so as to alter the volume of the streaming space between the first diffuser element and the second diffuser element.

8. The apparatus of claim 7, comprising:
one or more wall elements extending between the first diffuser element and the second diffuser element, the one or more wall elements being displaceably mounted with at least one degree of freedom.

9. The apparatus of claim 8, comprising:
a control device configured to control, based at least in part on flow information having been detected by the detecting device, one or more operations associated with the streaming device and/or the flow of the fluid stream flowing from the streaming device.

10. The apparatus of claim 9, wherein the one or more operations associated with the streaming device and/or the flow of the fluid stream flowing from the streaming device comprises:
at least of one flow parameter, the at least one flow parameter comprising a type of flow and/or a flow rate, the type of flow comprising a laminar flow and/or a turbulent flow;
a proportionate chemical composition of the fluid stream;
a movement of the detecting device;
a movement of the diffuser element; and/or
a movement of at least one of the one or more wall elements.

11. The apparatus of claim 1, comprising:
an output device configured to provide an optical output of at least one item of visualization information, the visualization information comprising a visualization of visualizing flow information detected by the detecting device.

12. A method of generatively manufacturing a three-dimensional object, the method comprising:
generating at least one energy beam with an energy beam generating device, the at least one energy beam selectively solidifying sequential layers of a build material in a processing chamber of an apparatus for additively manufacturing a three-dimensional object;
flowing a fluid stream through at least a portion of the processing chamber, the fluid stream generated with a fluid streaming device;
detecting with a detecting device, flow information describing a physical parameter and/or a chemical parameter of the fluid stream; and
diffusing the fluid stream with a diffuser element comprising a plurality of streaming openings configured to diffuse the fluid stream, the diffuser element being mounted so as to be displaceable in at least one degree of freedom.

13. The method of claim 12, comprising:
moving the detecting element in at least one degree of freedom, the detecting element being displacebly mounted in at least one degree of freedom, the at least one degree of freedom comprising a first position and a second position, the first position being in the processing chamber and the second position being in the processing chamber or outside the processing chamber.

14. The method of claim 13, wherein moving the detecting element in at least one degree of freedom comprises moving a coating unit of the apparatus, the detecting element being mounted to the coating unit, and the coating unit being displaceably mounted in at least one degree of freedom.

15. The method of claim 12, wherein the apparatus comprises a plurality of diffuser elements, wherein respective ones of the plurality of diffuser elements comprise a plurality of streaming openings configured to diffuse the fluid stream, wherein the plurality of diffuser elements are configured and arranged consecutively with a streaming space between adjacent respective ones of the plurality of diffuser elements; and
wherein the method comprises:
moving a first diffuser element from among the plurality of diffuser elements, the first diffuser element being displaceably mounted in at least one degree of freedom relative to a second diffuser element from among the plurality of diffuser elements, the first diffuser element being located adjacently upstream or adjacently downstream from the second diffuser element,
wherein moving the first diffuser element alters the volume of the streaming space between the first diffuser element and the second diffuser element.

16. The method of claim 15, comprising:
controlling with a control device, one or more operations associated with the streaming device and/or the flow of the fluid stream flowing from the streaming device, the controlling being based at least in part on flow information having been detected by the detecting device.

17. A computer-readable medium comprising computer-readable instructions, which when executed by a processor associated with an apparatus for additively manufacturing three dimensional objects, causes the apparatus to perform a method comprising:
generating at least one energy beam with an energy beam generating device, the at least one energy beam selectively solidifying sequential layers of a build material in a processing chamber of an apparatus for additively manufacturing a three-dimensional object;
flowing a fluid stream through at least a portion of the processing chamber, the fluid stream generated with a fluid streaming device;
detecting with a detecting device, flow information describing a physical parameter and/or a chemical parameter of the fluid stream;
diffusing the fluid stream with a diffuser element comprising a plurality of streaming openings configured to diffuse the fluid stream, the diffuser element being mounted so as to be displaceable in at least one degree of freedom; and
controlling with a control device, one or more operations associated with the streaming device and/or the flow of the fluid stream flowing from the streaming device, the controlling being based at least in part on flow information having been detected by the detecting device.

18. An apparatus for additively manufacturing a three-dimensional object, the apparatus comprising:
a processing chamber;
an energy beam generating device configured to generate an energy beam for selective solidification of sequential layers of a build material; and
a fluid streaming device configured to flow a fluid stream through at least a portion of the processing chamber;

a detecting device configured to detect flow information describing a physical parameter and/or a chemical parameter of the fluid stream; and one or more diffuser elements, wherein at least one of the one or more diffuser elements comprises a plurality of streaming openings having a honeycomb configuration configured to diffuse the fluid stream from the fluid streaming device into a uniform streaming profile, and wherein the at least one diffuser element is fluidly connected to the fluid streaming device.

19. The apparatus of claim 5, wherein the at least one diffuser element is movable between an operating position inside the processing chamber, and a non-operating position outside or inside the processing chamber.

20. The apparatus of claim 18, wherein the at least one diffuser element being mounted so as to be displaceable in at least one degree of freedom.

* * * * *